(12) United States Patent  (10) Patent No.: US 7,729,404 B1
Gregorski  (45) Date of Patent: Jun. 1, 2010

(54) METHOD FOR ALIGNING OPTICAL PACKAGES

(75) Inventor: Steven Joseph Gregorski, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/334,030

(22) Filed: Dec. 12, 2008

(51) Int. Cl.
*H01S 3/10* (2006.01)
*H01S 3/08* (2006.01)

(52) U.S. Cl. .............. 372/107; 372/21; 372/22
(58) Field of Classification Search ........... 372/21, 372/22, 107
See application file for complete search history.

(56) References Cited

U.S. PATENT DOCUMENTS

| | | | |
|---|---|---|---|
| 4,743,821 A | 5/1988 | Hall | 318/599 |
| 4,915,072 A | 4/1990 | Caron et al. | 123/357 |
| 4,937,510 A | 6/1990 | Konno et al. | 318/562 |
| 5,172,298 A | 12/1992 | Shimizu et al. | 361/152 |
| 5,481,187 A | 1/1996 | Marcott et al. | 324/207.16 |
| 5,600,237 A | 2/1997 | Nippert | 324/207.16 |
| 5,663,840 A | 9/1997 | Matsui | 359/814 |
| 5,886,978 A | 3/1999 | Matsui | 369/244 |
| 5,892,629 A | 4/1999 | Nishihara et al. | 359/814 |
| 6,246,563 B1 | 6/2001 | Olsson | 361/160 |
| 6,565,064 B2 | 5/2003 | Smith et al. | 251/129.04 |
| 6,714,364 B2 | 3/2004 | Suh | 359/813 |
| 6,798,635 B2 | 9/2004 | Olsson | 361/160 |
| 2007/0091411 A1 | 4/2007 | Mori et al. | 359/239 |

*Primary Examiner*—Armando Rodriguez
(74) *Attorney, Agent, or Firm*—Kwadjo Adusei-Poku

(57) ABSTRACT

A method is given for aligning an optical package comprising a laser, a wavelength conversion device, at least one adjustable optical component, and at least one actuator. The adjustable optical component may be moved to a command position by applying a pulse width modulated signal to the actuator. The command position represents an optimized alignment of the laser and wavelength conversion device. The actual position of the adjustable may be measured by measuring an output of a position measuring circuit, which may measure the voltage amplitude of an oscillation in a resonator tank circuit during an "off" period of the pulse-width modulated signal. The resonator tank circuit may comprise a capacitive element electrically coupled to the electrically conductive coil. The pulse-width modulated signal may then be adjusted to compensate for any difference in the actual position and the command position of the adjustable optical component. Additional embodiments are disclosed and claimed.

17 Claims, 7 Drawing Sheets

METHOD FOR ALIGNING OPTICAL PACKAGES

BACKGROUND

1. Technical Field

The present disclosure relates to semiconductor lasers, laser controllers, optical packages, and other optical systems incorporating semiconductor lasers. More specifically, the present disclosure relates to a method for aligning optical packages that include, inter alfa, a semiconductor laser and a second harmonic generation (SHG) crystal or another type of wavelength conversion device.

2. Technical Background

Short wavelength light sources can be formed by combining a single-wavelength semiconductor laser, such as an infrared or near-infrared distributed feedback (DFB) laser, distributed Bragg reflector (DBR) laser, or Fabry-Perot laser, with a light wavelength conversion device, such as a second harmonic generation (SHG) crystal. Typically, the SHG crystal is used to generate higher harmonic waves of the fundamental laser signal. To do so, the lasing wavelength is preferably tuned to the spectral center of the wavelength converting SHG crystal and the output of the laser is preferably aligned with the waveguide portion at the input facet of the wavelength converting crystal.

BRIEF SUMMARY

Waveguide optical mode field diameters of typical SHG crystals, such as MgO-doped periodically poled lithium niobate (PPLN) crystals, can be in the range of a few microns. As a result, the present inventor has recognized that it can be very challenging to properly align the beam from the laser diode with the waveguide of the SHG crystal. Accordingly, one object of the present disclosure is to provide a method for aligning components in optical packages that utilize a laser diode in conjunction with an SHG crystal or other type of wavelength conversion device to generate shorter wavelength radiation (e.g., green laser light) from a longer wavelength source (e.g., a near-infrared laser diode).

In accordance with one embodiment of the present disclosure, a method is given for aligning an optical package comprising a laser, a wavelength conversion device, at least one adjustable optical component, and at least one actuator. The optical package may contain additional optical components, such as lenses or mirrors, which facilitate the alignment. The adjustable optical component may comprise any one or more of these optical components, either alone or in any combination. This adjustment permits the alignment of the laser and the wavelength conversion device to be optimized. The method comprises three basic steps: moving the adjustable optical component to a command position by applying a pulse-width modulated signal to an actuator, measuring the actual position of the adjustable optical component, and adjusting the pulse-width modulated signal to compensate for any difference between the command position and the actual position of the adjustable optical component.

The adjustable optical component is moved to a command position by applying a pulse-width modulated signal to the actuator. The command position represents a position at which the alignment of the laser and the wavelength conversion device is optimized. The actuator is comprised of two magnetic elements which are in magnetic communication with each other. A first magnetic element is mechanically coupled to a base of the optical package, and a second magnetic element is mechanically coupled to the adjustable optical component. At least one of the magnetic elements comprises an electrically conductive coil, to which the pulse-width modulated signal is applied in order to effect movement of the adjustable optical component.

The method then measures the actual position of the adjustable optical component by measuring an output of a position measuring circuit. The position measuring circuit measures the voltage amplitude of an oscillation in a resonator tank circuit during an "off" period of the pulse-width modulated signal. The resonator tank circuit is formed by electrically coupling a capacitive element to the electrically conductive coil of the actuator. The voltage amplitude of the oscillation in the resonator tank circuit represents the actual position of the adjustable optical component. Thus, the output of the position measuring circuit represents the actual position of the adjustable optical component.

The method next adjusts the pulse-width modulated output so as to compensate for any difference in the actual position of the adjustable optical component and the command position.

Additional features and advantages will be set forth in the detailed description which follows and, in part, will be readily apparent to those skilled in the art from that description or recognized by practicing the embodiments described herein. It is to be understood that both the foregoing general description and the following detailed description are intended to provide an overview or framework for understanding the nature and character of the present disclosure.

BRIEF DESCRIPTION OF THE DRAWINGS

The following detailed description of specific embodiments can be best understood when read in conjunction with the following drawings, where like structure is indicated with like reference numerals and in which.

DETAILED DESCRIPTION

Figure 1:
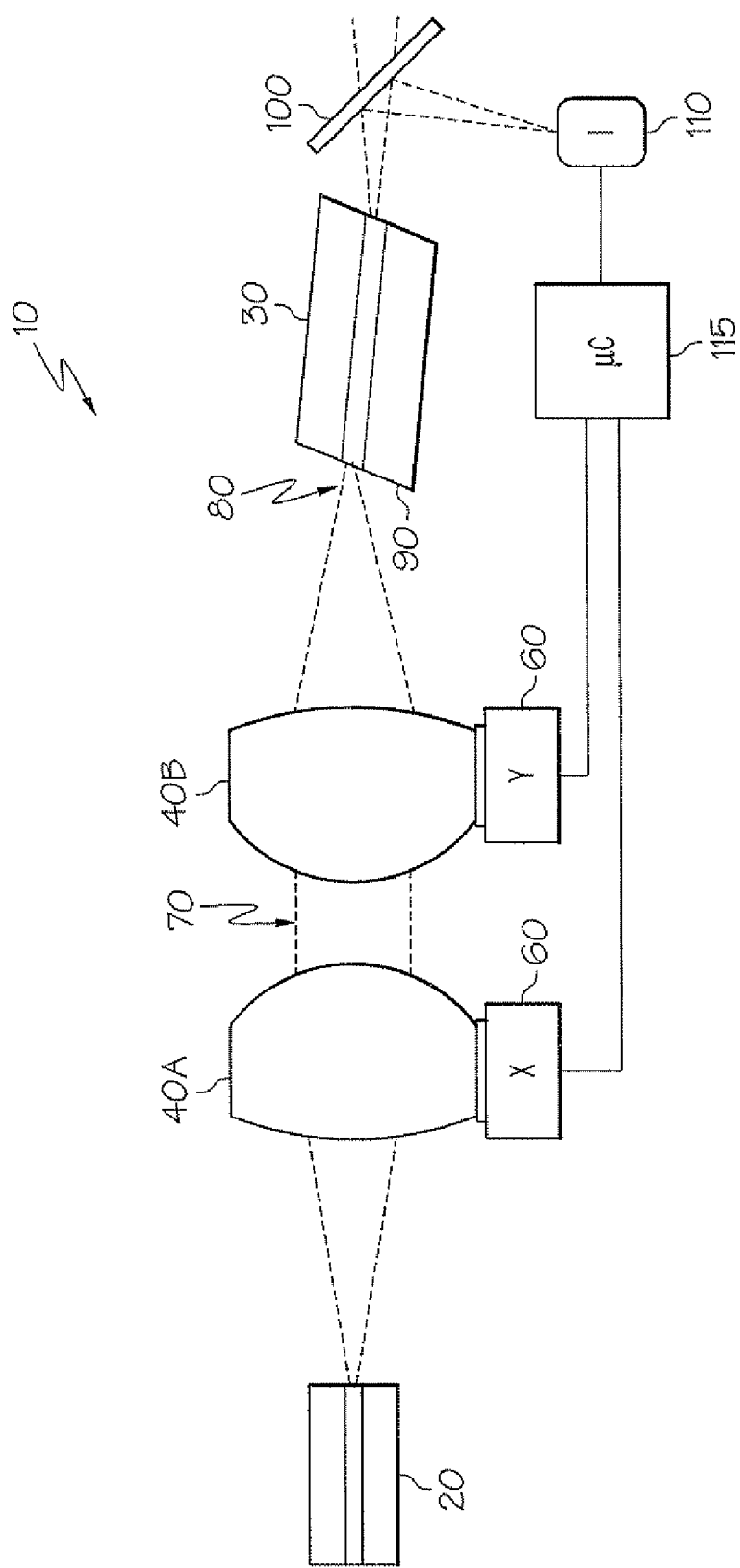
FIG. 1 is a drawing of the optical package according to one embodiment of the present disclosure.
Figure 2:
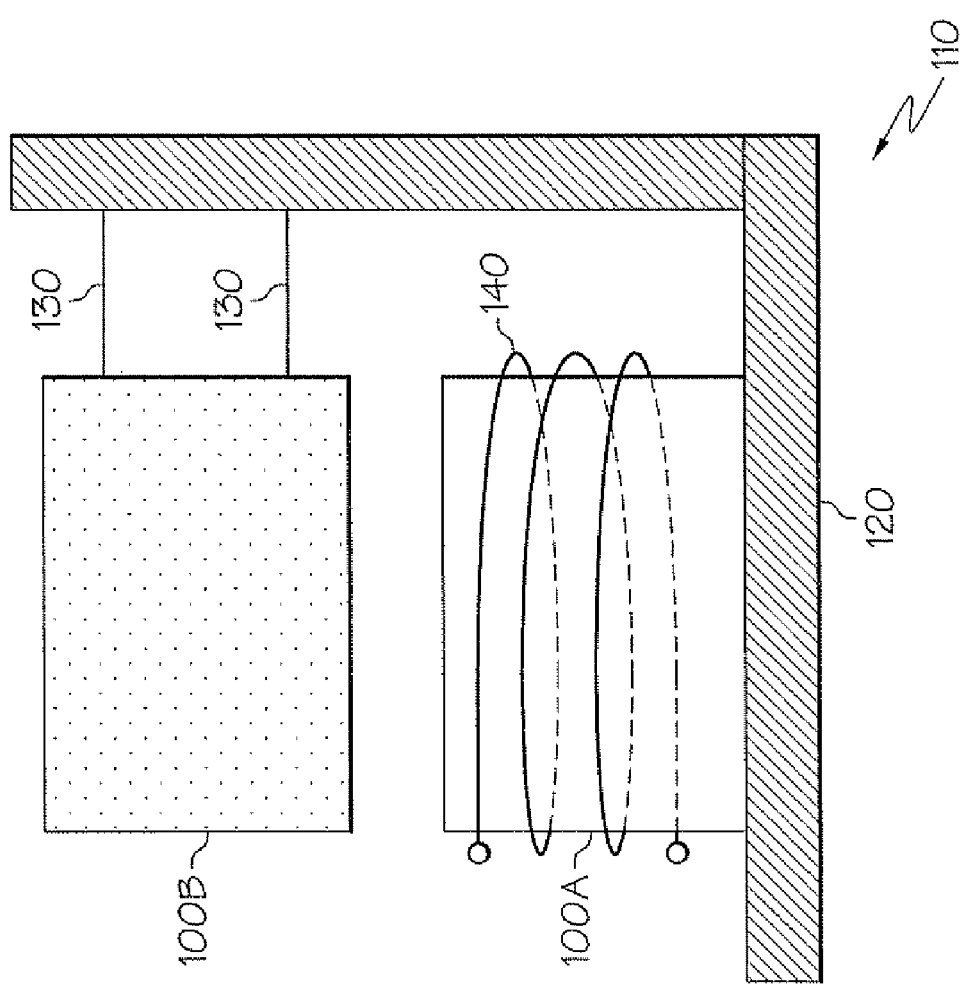
FIG. 2 shows an actuator according to one embodiment of the present disclosure.

A method for aligning an optical package 10 according to one embodiment can be illustrated with reference to FIG. 1. The optical package 10 comprises a laser 20, a wavelength conversion device 30, at least one adjustable optical component 40A, 40B, and at least one actuator 60 is given. The adjustable optical components 40A, 40B are moved to command positions by applying a pulse-width modulated signal to the actuator 60. The command positions represent an optimized alignment of the laser 20 and the wavelength conversion device 30. Referring now to FIGS. 1 and 2, the actuator 60 comprises a first and second magnetic elements 100A, 100B. The first magnetic element 100A is mechanically coupled to a base 120 of the optical package 10, and the second magnetic element 100B is mechanically coupled to the adjustable optical component 40A, 40B. The first magnetic element 100A and the second magnetic element 100B are in magnetic communication with each other. At least one of the magnetic elements 100A, 100B comprises an electrically conductive coil 140 to which the pulse-width modulated signal is applied. The application of the pulse-width modulated signal to the electrically conductive coil 140 creates a magnetic field of sufficient strength to move the adjustable optical components 40A, 40B in at least one axis of motion.

Figure 3:
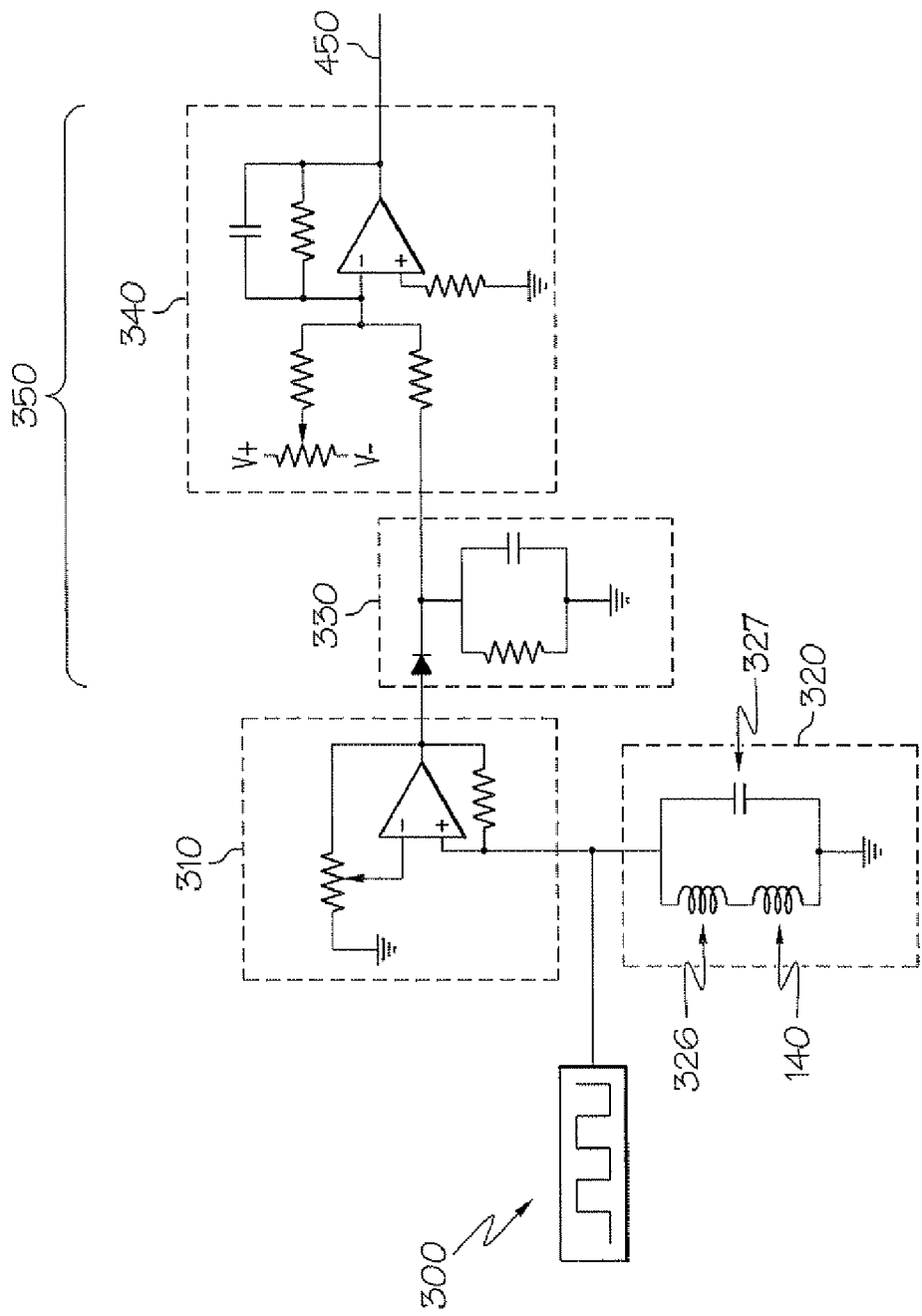
FIG. 3 depicts an electrical schematic of the resonator tank circuit and the position measuring circuit according to one embodiment of the present disclosure.

Referring to FIG. 3, the actual positions of the adjustable optical components 40A, 40B can be measured by measuring an output 450 of a position measuring circuit 350. In the embodiment described herein, the position measuring circuit 350 comprises a rectifier circuit 330 and a filter circuit 340. The output 450 of the position measuring circuit 350 represents a voltage amplitude 440 of an oscillation in a resonator tank circuit 320 during an "off" period 410 of the pulse-width modulated signal 300. The resonator tank circuit 320 comprises the electrically conductive coil 140 electrically coupled to a capacitive element 327. The voltage amplitude 440 of the oscillation in the resonator tank circuit 320 represents the actual position of the adjustable optical component 40A, 40B.

To align the optical package 10, the pulse-width modulated signal 300 is adjusted to compensate for the difference between the represented actual position and the command positions.

The particular embodiment of the optical package 10 disclosed herein is for illustrative purposes only. Those skilled in the art will recognize that numerous embodiments of the optical package are possible and are taught in readily available technical literature relating to the design and fabrication of frequency or wavelength-converted semiconductor laser sources. In the embodiment depicted in FIG. 1, the near infrared light emitted by the laser 20 is coupled into a waveguide portion of the wavelength conversion device 30 by optical components 40A, 40B that are adjustable in the X and Y dimension, such as a suitable lens or mirror which may comprise one or more optical elements of unitary or multi-component configuration. The optical package illustrated in FIG. 1 is particularly useful in generating a variety of shorter wavelength laser beams from a variety of longer wavelength semiconductor lasers and can be used, for example, as a visible laser source in a laser projection system.

Referring again to FIG. 1, the adjustable optical components 40A, 40B are particularly helpful because it is often difficult to focus the output beam emitted by the laser 20 into the waveguide portion of the wavelength conversion device 30. For example, waveguide optical mode field diameters of typical SHG crystals, such as MgO-doped periodically poled lithium niobate (PPLN) crystals, can be in the range of a few microns. The adjustable optical components 40A, 40B cooperate with the laser 20 to generate a beam spot 80 of appropriate size on the input face 90 of the wavelength conversion device 30. In the embodiment shown in FIG. 1, a first adjustable optical component 40A is configured to be adjusted only in the direction of the "X" axis, and a second adjustable optical component 40B is configured to be adjusted only in the direction of the "Y" axis. Thus, in this embodiment, the adjustable optical components 40A and 40B cooperate with each other to actively align the beam spot 80 with the waveguide portion of the wavelength conversion device 30 by altering the position of the beam spot 80 on the input face 90 of the wavelength conversion device 30 until it is aligned with the waveguide portion of the wavelength conversion device 30.

In the embodiment of FIG. 1, the adjustable optical components 40A and 40B comprise a pair of lenses. However, as those skilled in the art will recognize, other types of optical components may be used, such as mirrors. Also, the adjustable optical component may comprise other optical components in the optical package, including but not limited to the laser 20 or the wavelength conversion device 30.

In the embodiment described herein, two optical components are adjusted in order to align the optical package 10. However, it is contemplated that only one adjustable optical component 40A, 40B can be used. As an illustrative example, the optical package may comprise two lenses, one of which is adjustable and one of which is fixed. The only adjustable optical component in such a system could be one of the lenses. The remaining optical components (i.e., the laser 20, the wavelength conversion device 30, and the other lens) could be fixed and would not be adjustable. Furthermore, in this type of system the sole adjustable component may be moved in either one axis of motion, two axes of motion, three axes of motion, etc. A separate actuator may be required to effect movement in each axis of motion. Other embodiments may permit any one of the other optical components in the optical package to be adjusted, while keeping the other optical components fixed. As another example, the laser 20 may be the adjustable optical component, while the remaining optical components of the optical package 10 would be fixed.

In other embodiments, it is contemplated that two or more optical components may be adjusted in order to optimize the alignment of the optical package 10. These adjustable optical components may comprise any combination of the optical components present in the optical package 10. As an illustrative example, in an optical package 10 comprising a laser 20, a wavelength conversion device 30, and two lenses, all the components may be adjustable. In an alternative embodiment, one of the lenses and the laser may be adjustable. Many combinations of adjustable optical components 40A, 40B are possible. Furthermore, of the two or more adjustable optical components 40A, 40B, any one of them may be adjustable in either one, two, or three axes of motion, independent of the other adjustable optical components 40A, 40B. Continuing with the illustrative example, the laser may be adjustable in two axes of motion, while one of the lenses may only be adjustable in one axis of motion. Those skilled in the art will recognize that many combinations of adjustable optical components 40A, 40B are possible, as well as their corresponding adjustability in up to three axes of motion.

When referring to the movement of the adjustable optical component 40A, 40B, the embodiment described herein contemplates the definition of the term "axis of motion" to include any direction that is parallel to the laser beam 70, perpendicular to the laser beam 70, or which may have both a parallel and perpendicular component with respect to the laser beam 70. In the embodiment described herein, the movement of the adjustable optical component 40A, 40B may be in one direction perpendicular to the laser beam 70, or in two directions perpendicular to the laser beam 70 and to each other.

For the purposes of describing and defining the present invention, it is noted that there will be varying degrees of "optimized" alignment between the laser 20 and the wavelength conversion device 30. For example, although an "optimized" alignment may be established as the one configuration where the output of the wavelength conversion device 30 is at an absolute maximum, it is also contemplated that a particular alignment state may qualify as an "optimized" alignment if the optical output of the wavelength conversion device 30 merely exceeds a given threshold. That given threshold may be presented as a given optical power level, a percentage of maximum power, etc.

Referring now to FIG. 2, the actuator 60 comprises two magnetic elements 100A and 100B. The first magnetic element 100A comprises an electrically conductive coil 140. The first magnetic element 100A is coupled to a base 120 of the optical package 10, while the second magnetic element 100B is coupled to the adjustable optical component. The magnetic elements are in magnetic communication with each other such that the application of a pulse-width modulated signal to the electrically conductive coil 140 produces a magnetic field of sufficient strength to move the adjustable optical component 40A, 40B in at least one axis of motion.

It to be understood that a magnetic element can be any structure that comprises a material upon which an attractive or repulsive force can be generated due to the presence of a magnetic field, including but not limited to a permanent magnet, a structure (like an electromagnetic coil) that comprises a permanent magnet, a metal that responds to a magnetic field, a structure that comprises a metal that responds to a magnetic field, or combinations thereof. Where the magnetic element is an electrically conductive coil 140, it is contemplated that although typical electrically conductive coils comprise a wire (or other suitable electrical conductor) wound a number of time around a ferrite core, other methods of creating an electrically conductive coil can be gleaned from conventional or yet-to-be-developed teachings in the art.

In the embodiment described herein, the first magnetic element 100A comprises an electrically conductive coil 140, and the second magnetic element 100B comprises a permanent magnet. An alternative embodiment may reverse the magnetic elements: the first magnetic element 100A (coupled to the base 120) may comprise the permanent magnet, and the second magnetic element 100B (coupled to the adjustable optical component 40A, 40B) may comprise the electrically conductive coil 140. It is to be understood that many combinations of magnetic elements are possible in order to achieve the same purpose.

In one embodiment, a flexure wire 130 holds the second magnetic element 100B (and the corresponding adjustable optical component 40A, 40B) in place while still affording movement by the actuator 60. One end of the flexure wire 130 is mechanically coupled to the second magnetic element 100B, and the other end of the flexure wire is mechanically coupled to the base 120 of the optical package 10. The flexure wire provides mechanical rigidity to the adjustable optical component 40A, 40B and keeps it in a "rest position" in the absence of a pulse width modulated signal. Application of a pulse width modulated signal creates a movement of the adjustable optical component 40A, 40B, the force of which is opposed by the flexure wire 130. As the adjustable optical component 40A, 40B moves further away from the "rest position," the opposing force generated by the flexure wire 130 increases. In this fashion, the magnitude of the pulse-width modulated signal controls the position of the adjustable optical component 40A, 40B. The force generated by the actuator 60 either repels or attracts the adjustable optical component 40A, 40B. Those skilled in the art will recognize that other mechanical devices may be substituted for the flexure wire 130, including but not limited to coil springs, mechanical guides, or any other component or assembly which keeps the second magnetic element 40B and the adjustable optical component 40A, 40B in a known "rest position" in the absence of the pulse-width modulated signal. These other embodiments may achieve the same effect of providing mechanical rigidity as well as opposing the force generated by the actuator 60.

FIG. 3 depicts one configuration of the resonator tank circuit 320 and the position measuring circuit 350. The resonator tank circuit 320 comprises the electrically conductive coil 140 and a capacitive element 327. The capacitive element 327 may comprise a capacitor. In addition, as will be described herein, the resonator tank circuit 320 may also comprise a ballast inductor 326. If the ballast inductor 326 is not present in the circuit, it may be electrically replaced by a short circuit. A pulse-width modulated signal 300 is applied to the electrically conductive coil 140 (which is part of the resonator tank circuit 320) in order to move an adjustable optical component to a command position. The resulting electrical current in the electrically conductive coil 140 creates a magnetic field which operates to produce a force between the magnetic elements 100A, 100B sufficient to move the adjustable optical component 40A, 40B. In the embodiment described herein, the pulse-width modulated signal 300 creates a positive or negative electrical current in the electrically conductive coil 140. The corresponding magnetic field produced by the electrically conductive coil 140 will also be of two polarities. If the second magnetic element 100B is a permanent magnet, the polarity of the magnetic field will determine whether the magnetic force between the magnetic elements 100A, 100B is attractive or repulsive. In this fashion, the pulse-width modulated signal 300 controls the polarity and strength of the magnetic force between the magnetic elements 100A, 100B of the actuator 60. The frequency of the pulse-width modulated signal 300 may be higher than the mechanical response time of the actuator 60 so that the actuator 60 acts as a low-pass filter. In this fashion, the application of a pulse-width modulated signal 300 to the actuator 60 results in smooth movement of the adjustable optical component 40A, 40B.

Figure 4A:
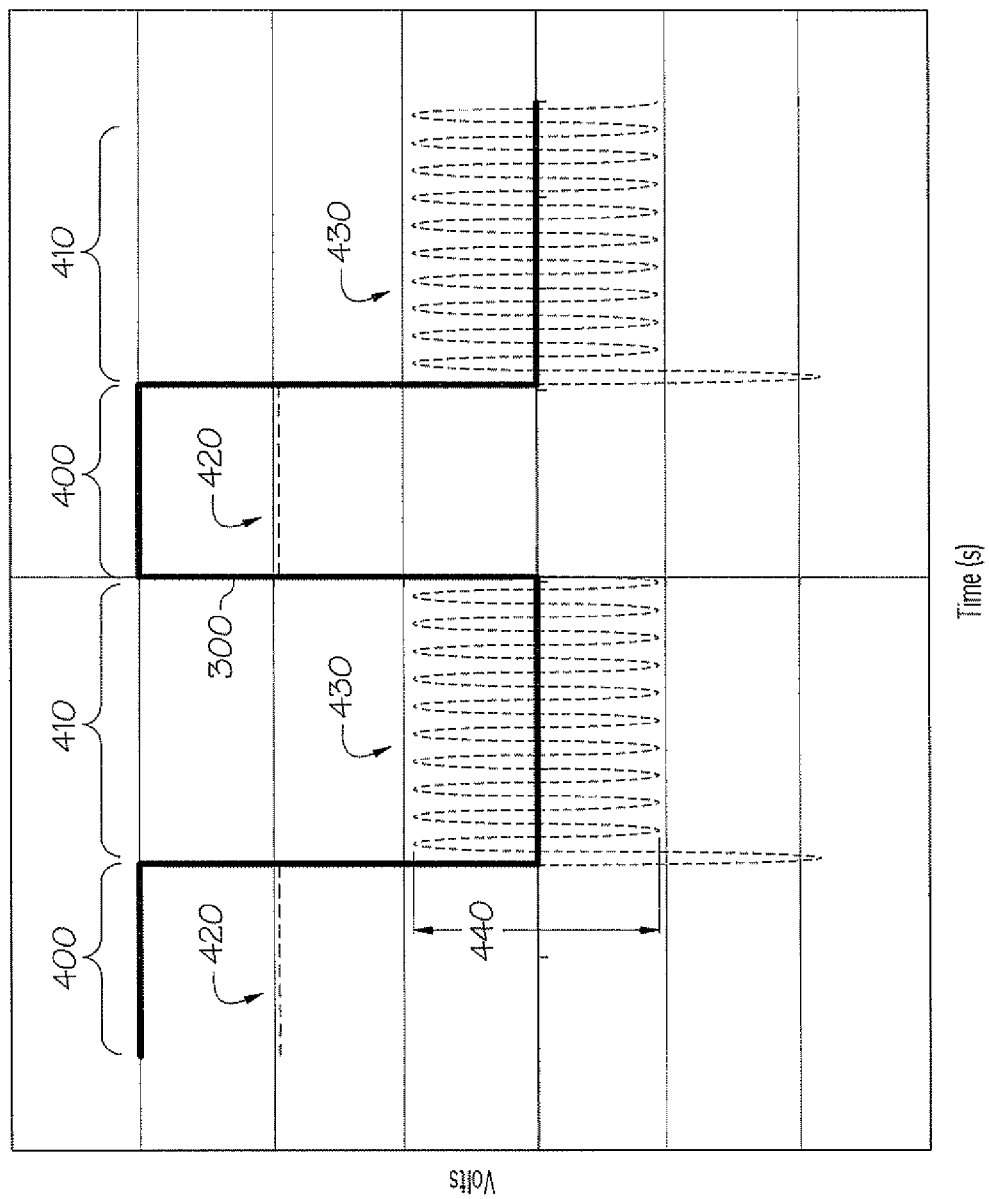
FIGS. 4a and 4b show the pulse-width modulated signal and the voltage amplitude of the resonator tank circuit according to one embodiment of the disclosure.

Referring to FIGS. 3 and 4a, the pulse-width modulated signal 300 applied to the electrically conductive coil 140 comprises two distinct time periods: an "on" period 400 and an "off" period 410. During the "on" period 400, the pulse width modulated signal 300 connects the electrically conductive coil 140 to a power supply, which causes the electrical current in the electrically conductive coil 140 to increase. During the "off" period 410, the pulse-width modulated signal 300 disconnects the power supply (not shown) from the electrically conductive coil 140 and allows the electrical current to begin to decay. By applying the pulse-width modulated signal 300 in this fashion, an average electrical current is passed through the electrically conductive coil 140 which may be adjusted by changing the duty cycle of the pulse-width modulated signal 300, as is well known to those skilled in the art. Because the force of the magnetic field generated by the electrically conductive coil 140 and the magnetic element 100A, 100B is related to the amplitude of the current passing through the electrically conductive coil 140, the movement of the adjustable optical component 40A, 40B is effected by adjusting the duty cycle of the pulse-width modulated signal 300.

Referring again to FIG. 3, the resonator tank circuit 320 is formed by electrically coupling a capacitive element 327 to the electrically conductive coil 140. The capacitive element 327 causes the resonator tank circuit 320 to oscillate during the "off" period 410 of the pulse-width modulated signal 300. The voltage amplitude 440 of the oscillation in the resonator tank circuit 320 decays if any resistance is in the circuit, due to, for example, any resistance in electrically conductive coil 140. Thus, in the embodiment described herein, a feedback amplifier 310 provides a mechanism to sustain the voltage oscillation during the "off" period 410, thus causing the voltage amplitude 440 of the oscillation to remain substantially constant. Those skilled in the art will appreciate that a number of amplifier circuits may be used for sustaining the oscillation of the resonator tank circuit, including, but not limited to, amplifier circuits comprising an operational amplifier, a bipolar junction transistor, or a field-effect transistor.

According to one embodiment, the position measuring circuit 350 comprises a rectifier circuit 330 and a filter circuit 340. The output 450 of the position measuring circuit 350 is a signal which represents the voltage amplitude 440 in the resonator tank circuit 320 during the "off" period 410 of the pulse-width modulated signal 300. The output 450 during the "off" period 410 may be measured by an analog-to-digital converter. Many other types of circuits are possible which perform the same function. Other embodiments may include similar measuring circuits, as is known to those skilled in the art. Such circuits may include, for example, measuring the voltage amplitude 440 of the resonator tank circuit 320 directly with a fast analog-to-digital converter.

In one embodiment, the resonator tank circuit 320 may also comprise a ballast inductor 326 which is electrically connected to the electrically conductive coil 140. The ballast inductor 326 insures that there is a minimum amount of inductance in the resonator tank circuit 320 in the event the inductance of the electrically conductive coil 140 becomes very small, such as may occur when the two magnetic elements 100A, 100B are in very close proximity to one other.

The frequency of the oscillation in the resonator tank circuit 320 depends primarily on the inductance of the ballast inductor 326 and the electrically conductive coil 140, as well as the capacitive element 327. The frequency of the oscillation may change somewhat as the inductance of the electrically conductive coil 140 changes. However, the position measuring circuit 350 may be designed to not be affected by the change in frequency. In the embodiment described herein, the frequency of the oscillation in the resonator tank circuit 320 may be greater than the frequency of the pulse-width modulated signal 300.

Figure 4B:
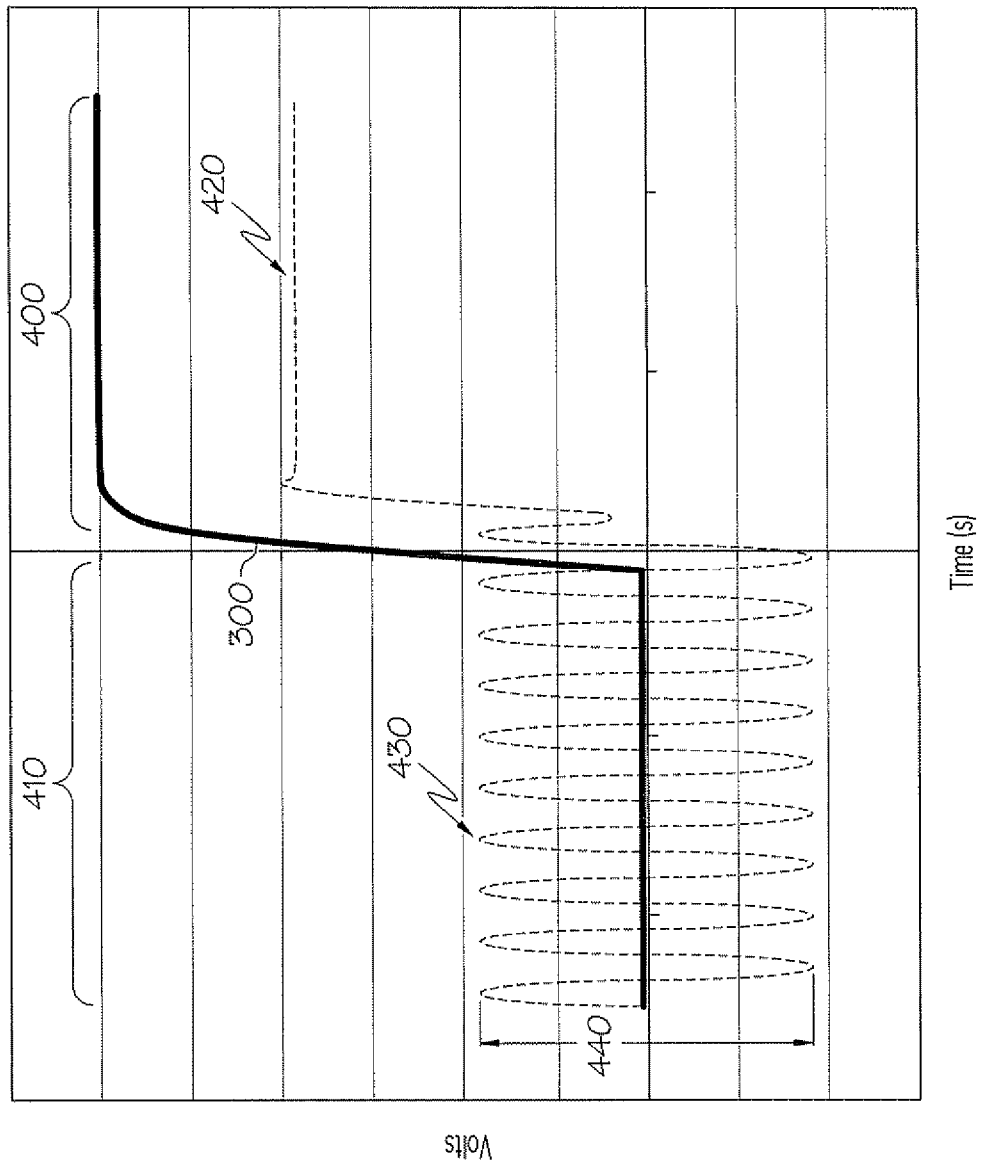
Figure 4C:
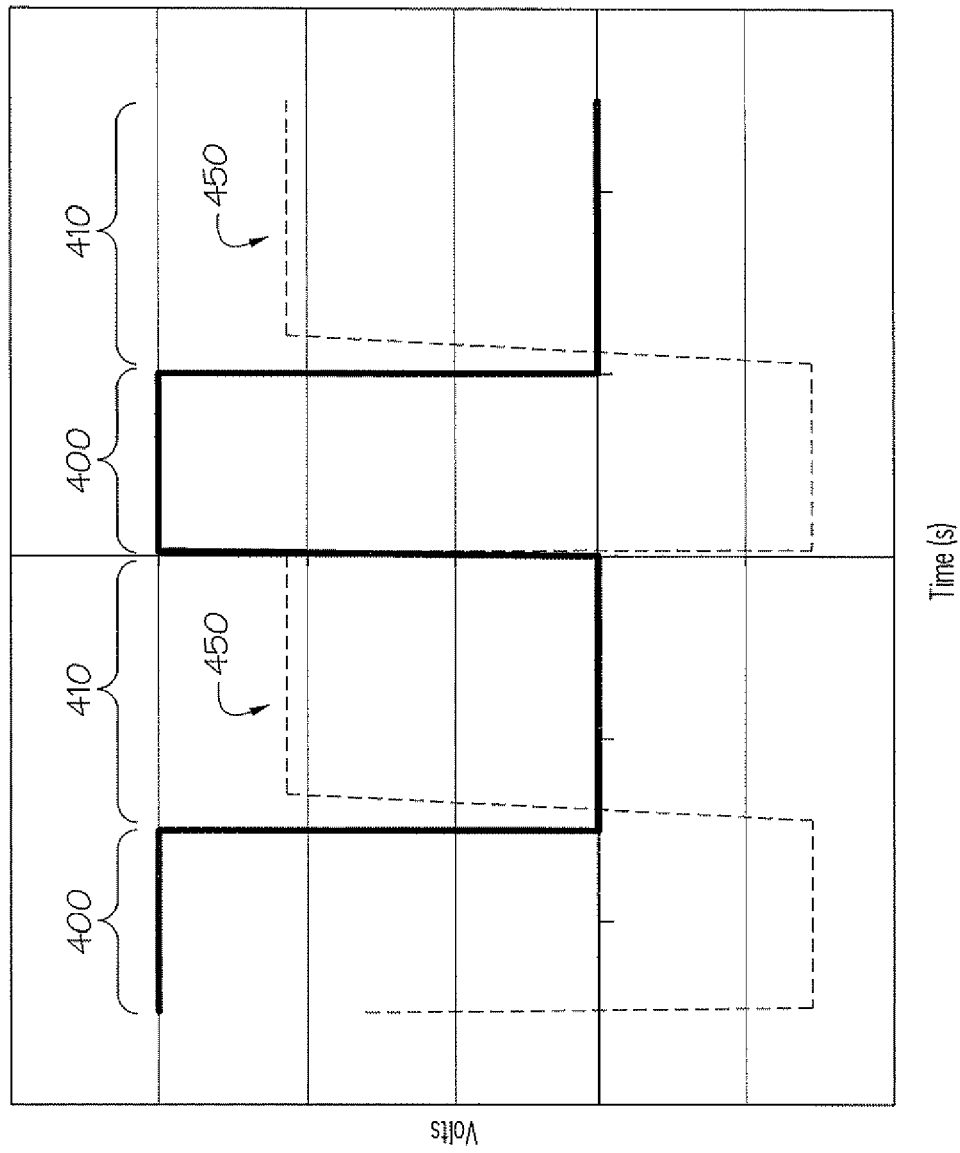
FIG. 4c shows the pulse-width modulate signal and the output of the position measuring circuit according to one embodiment of the disclosure.

Referring to FIGS. 4A and 4B, the pulse-width modulated signal 300 and its relationship to the resonator tank circuit voltages 420, 430 are shown. The pulse-width modulated signal 300 may have an "on" period 400 and an "off" period 410. During the "on" period 400, the resonator tank circuit voltage 420 may, as shown in the embodiment herein, remain relatively constant. However, during the "off" period 410, the resonator tank circuit voltage 430 may oscillate. FIGS. 4A and 4B depict the relationship between these two signals. FIG. 4B shows a close-up of the resonator tank circuit oscillation voltage, illustrating the frequency of oscillation of the resonator tank circuit voltage 430 during the "off" period 410.

The voltage amplitude 440 of the oscillation in the resonator tank circuit 320 during the "off" period 410 depends on the distance between the two magnetic elements 100A, 100B. As the distance between the two magnetic elements 100A, 100B changes, the electrical inductance of the electrically conductive coil 140 changes. As a consequence, the voltage amplitude 440 of the oscillation in resonator tank circuit 320 also changes. Thus, the measurement of the voltage amplitude 440 of the oscillation in the resonator tank circuit 320 is an indirect measurement of the position of the adjustable optical component 40A, 40B.

Referring now to FIGS. 3 and 4A-C, the embodiment described herein includes a position measuring circuit 350 which may comprise a rectifier circuit 330 and a filter circuit 340. The position measuring circuit 350 measures the voltage amplitude 440 of the oscillation in the resonator tank circuit 320 during an "off" period 410 of the pulse-width modulated signal 300 by rectifying (through the rectifier circuit 330) and filtering (through the filter circuit 340) the voltage of the resonator tank circuit 320. The output 450 of the position measuring circuit 350 during the "off" period 410 is a substantially DC (direct current) voltage which represents the voltage amplitude 440 of the resonator tank circuit 320. As previously discussed, because the voltage amplitude 440 represents the position of the adjustable optical component 40A, 40B, the output 450 of the position measuring circuit 350 also represents the position of the adjustable optical component 40A, 40B. Those skilled in the art will recognize that a variety of circuits may be used to measure the voltage amplitude 440. Such circuits may include, by way of illustrative example, an analog-to-digital converter or a voltage integrator circuit.

Figure 5:
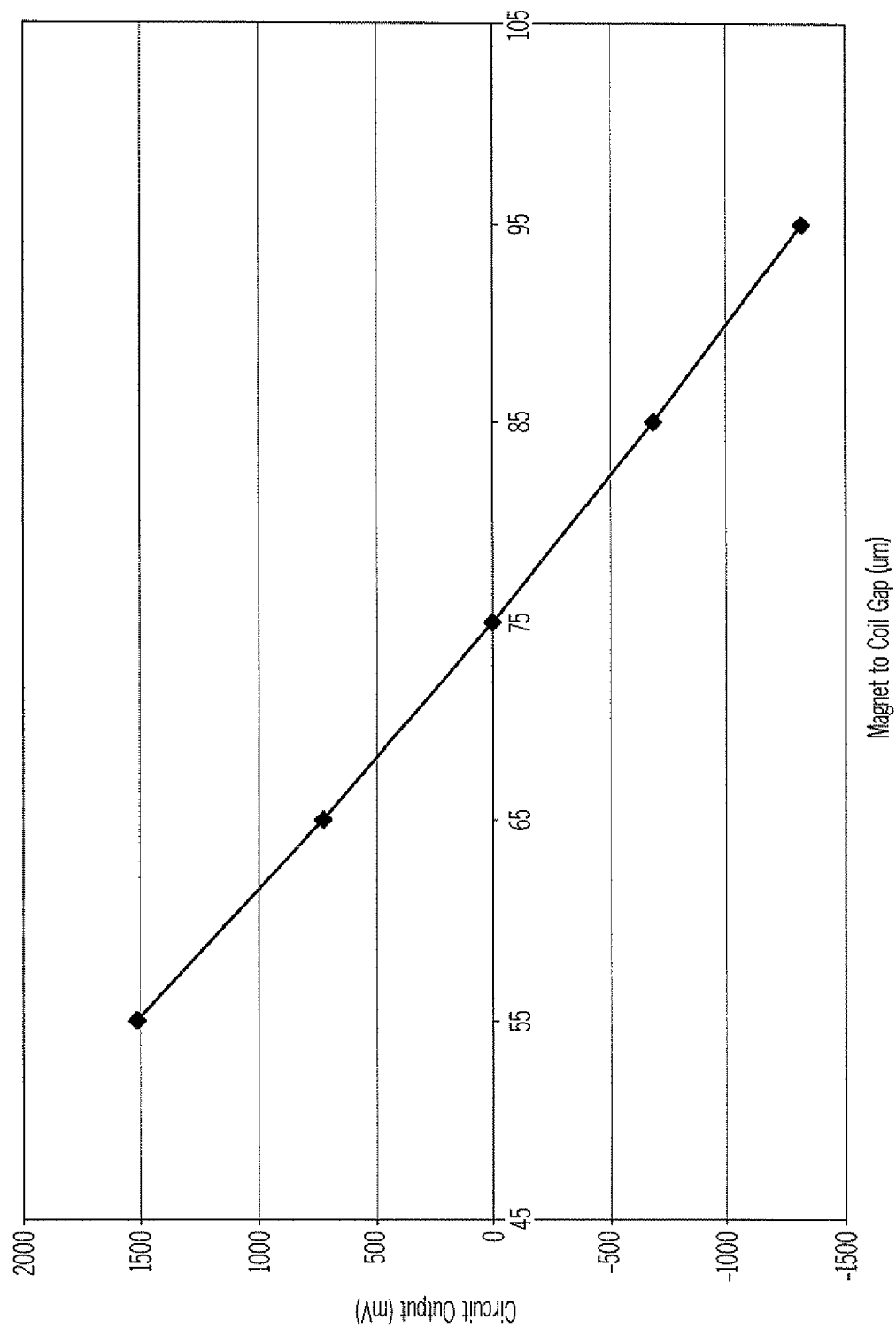
FIG. 5 depicts the relationship between the actual position of the adjustable optical component and the voltage amplitude of the oscillation in the resonator tank circuit according to one embodiment of the disclosure.

Referring to FIG. 5, the relationship between the voltage amplitude 440 of the oscillation in the resonator tank circuit 320 and the actual position of the adjustable optical component 40A, 40B is given as an illustrative example. The relationship may be substantially linear. In one embodiment, the flexure wire 130 maintains the adjustable optical component 40A, 40B at an approximate position of 75 μm in the absence of a pulse-width modulated signal 300. Applying a pulse-width modulated signal 300 may move the adjustable optical component up to 20 μm in either direction, depending on the polarity of the pulse-width modulated current. This movement results in the output 450 of the position measuring circuit 350 to vary approximately from +1500 mV to −1500 mV. It is to be understood that other voltage ranges and position ranges are possible.

According to the embodiment described herein, the pulse-width modulated signal 300 may be adjusted in order to compensate for a difference between the actual position of the adjustable optical component 40A, 40B (as measured by the position measuring circuit 350) and the command position. Such an adjustment may include, for example, increasing or decreasing the duty cycle of the pulse-width modulated signal 300. In addition, this adjustment may be performed as frequently as is required by the application. Furthermore, The method may be repeated any number of times to periodically or continuously maintain the adjustable optical component at the command position.

Referring again to FIG. 1, in another embodiment, the optical package 10 comprises an optical intensity feedback loop comprising a partially reflective mirror 95, an optical detector 110, and a microcontroller 115. The mirror 95 reflects a portion of the optical output of the wavelength conversion device 30 to an optical detector 110. The optical detector 110 measures the optical intensity of the reflected output and communicates the measure to the microcontroller 115. In this system, the microcontroller 115 determines the command position by identifying points at which the optical intensity reaches an approximate maximum value. The command position may be determined either during the manufacture of the optical package 10, during the operation of the optical package 10, or both.

It is contemplated that an automatic control system may perform each step in the method, including applying a pulse-width modulated signal to an actuator to move the adjustable optical component 40A, 40B to a command position, measuring the actual position of the adjustable optical component 40A, 40B, and adjusting the pulse-width modulated signal 300 to compensate for a difference in the command position and actual position. Such a control system may be comprised of a microprocessor executing program instructions to adjust the pulse width-modulated signal 300, or it may be comprised of discrete analog components connected together in such a fashion to adjust the pulse-width modulated signal 300. Those skilled in the art will recognize that there are numerous methods to implement such a control system by using various combinations of digital and analog components. Furthermore, the automatic control system may be implemented in a single integrated circuit, either by itself or combined with other circuits.

The embodiments described herein permit the adjustable optical components 40A, 40B to be kept at the command positions, notwithstanding any external force which, without this method, may cause the adjustable optical component 40A, 40B to move away from the command position. Such external forces may include gravity or the stress in the optical package 10 caused by a temperature change. Also, this force may be the result of vibration or shock to the optical package 10 or any of its components.

Although the embodiments described herein refer to "a laser," "the laser," "a wavelength conversion device," and "the wavelength conversion device," it is contemplated that the optical package may comprise more than one laser or more than one wavelength conversion device. As an illustrative example, an optical package may comprise two lasers and two corresponding wavelength conversion devices. The alignment of each laser/wavelength conversion device pair may be optimized according to the principles described herein.

It is noted that recitations herein of a component of the present disclosure being "configured" to embody a particular property are structural recitations as opposed to recitations of intended use. More specifically, the references herein to the manner in which a component is "configured" denotes an existing physical condition of the component and, as such, is to be taken as a definite recitation of the structural characteristics of the component.

It is noted that terms like "preferably" and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present invention or to emphasize alternative or additional features that may or may not be utilized in a particular embodiment of the present invention.

For the purposes of describing and defining the present invention it is noted that the terms "substantially" and "approximately" are utilized herein to represent the inherent degree of uncertainty that may be attributed to any quantitative comparison, value, measurement, or other representation. For example, the voltage amplitude of the oscillation in the resonator tank circuit may, under some conditions, remain substantially constant. The terms "substantially" and "approximately" are also utilized herein to represent the degree by which a quantitative representation may vary from a stated reference without resulting in a change in the basic function of the subject matter at issue. For example, the output of the position measuring circuit may vary approximately from +1500 mV to −1500 mV.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the method and should be interpreted in like manner as the more commonly used open-ended preamble term "comprising."

The invention claimed is:

1. A method for aligning an optical package comprising a laser, a wavelength conversion device, at least one adjustable optical component, and at least one actuator, wherein the actuator comprises a first and second magnetic elements, and the method comprises:
    moving the adjustable optical component to a command position by applying a pulse-width modulated signal to the actuator, wherein
        the command position represents an optimized alignment of the laser and the wavelength conversion device,
        the first magnetic element is mechanically coupled to a base of the optical package and the second magnetic element is mechanically coupled to the adjustable optical component,
        the first and second magnetic elements are in magnetic communication with each other,
        at least one of the magnetic elements comprises an electrically conductive coil wherein the pulse-width modulated signal is applied to the electrically conductive coil to create a magnetic field of sufficient strength to move the adjustable optical component in at least one axis of motion; and
    measuring an actual position of the adjustable optical component by measuring an output of a position measuring circuit, wherein
        the output of the position measuring circuit represents a voltage amplitude of an oscillation in a resonator tank circuit during an "off" period of the pulse-width modulated signal,
        the resonator tank circuit comprises the electrically conductive coil electrically coupled to a capacitive element, and
        the voltage amplitude of the oscillation represents the actual position of the adjustable optical component; and
    adjusting the pulse-width modulated signal to compensate for a difference between the represented actual position and the command position.

2. The method of claim 1 wherein:
    the optical package comprises an optical intensity feedback loop operable to determine the command position as a function of optical intensity at an output of the wavelength conversion device.

3. The method of claim 2 wherein the command position is determined by identifying the position at which the optical intensity at the output of the wavelength conversion device reaches an approximate maximum value.

4. The method of claim 2 wherein the command position is determined during manufacture of the optical package, during operation of the optical package, or both.

5. The method of claim 1 wherein the resonator tank circuit comprises an amplifier electrically coupled to the resonator tank circuit for sustaining the resonator tank circuit oscillation voltage.

6. The method of claim 5 wherein the amplifier comprises an operational amplifier, a bipolar junction transistor, or a field-effect transistor.

7. The method of claim 1 wherein the resonator tank circuit comprises a ballast inductor which is electrically coupled to the electrically conductive coil for ensuring that the resonator tank circuit will oscillate.

8. The method of claim 1 wherein the capacitive element of the resonator tank circuit comprises a capacitor.

9. The method of claim 1 wherein the position measuring circuit comprises a rectifier circuit and a filter circuit.

10. The method of claim 9 wherein the output of the position measuring circuit is measured with an analog-to-digital converter.

11. The method of claim 1 wherein the position measuring circuit comprises an analog-to-digital converter.

12. The method of claim 1 wherein the frequency of the pulse-width modulated signal is less than the frequency of the resonator tank circuit oscillation voltage.

13. The method of claim 1 wherein an automatic control system measures the actual position of the adjustable optical component and adjusts the pulse-width modulated signal.

14. The method of claim 13 wherein the automatic control system comprises a microprocessor executing program instructions for adjusting the pulse-width modulated signal or analog circuit components for adjusting the pulse-width modulated signal.

15. The method of claim 1 wherein the second magnetic element or the adjustable optical component is mechanically coupled to the base of the optical package by a mechanical device providing sufficient rigidity to keep the adjustable optical component at a known position in an absence of the pulse-width modulated signal.

16. The method of claim 15 wherein the mechanical device opposes the force produced by the actuator.

17. The method of claim 15 wherein the mechanical device is at least one flexure wire.

* * * * *